United States Patent
Pai et al.

(10) Patent No.: US 11,448,611 B2
(45) Date of Patent: Sep. 20, 2022

(54) STRUCTURALLY REINFORCED SENSOR AND METHOD FOR MANUFACTURING THE SAME

(71) Applicant: MEDTRONIC MINIMED, INC., Northridge, CA (US)

(72) Inventors: Christina Pai, Santa Clarita, CA (US); Brian P. McGee, Santa Clarita, CA (US); Mohsen Askarinya, Chandler, AZ (US); Mary Ellen B. Coe, Prescott, AZ (US); Cynthia J. Jones, Palmdale, CA (US); Hsiu-Hsin Chung, Gilbert, AZ (US); Nathan Hobbs, Los Angeles, CA (US); Jorge L. Nieto, Los Angeles, CA (US); Anirban Chakraborty, Northridge, CA (US)

(73) Assignee: Medtronic MiniMed, Inc., Northridge, CA (US)

( * ) Notice: Subject to any disclaimer, the term of this patent is extended or adjusted under 35 U.S.C. 154(b) by 367 days.

(21) Appl. No.: 16/503,235

(22) Filed: Jul. 3, 2019

(65) Prior Publication Data

US 2021/0003526 A1    Jan. 7, 2021

(51) Int. Cl.
    *G01N 27/327*      (2006.01)
(52) U.S. Cl.
    CPC ................. *G01N 27/3272* (2013.01)
(58) Field of Classification Search
    CPC .......................................... G01N 27/327–3278
    USPC ..... 204/403.01–403.15; 205/777.5–778, 792
    See application file for complete search history.

(56) References Cited

U.S. PATENT DOCUMENTS

| | | | |
|---|---|---|---|
| 4,755,173 A | | 7/1988 | Konopka et al. |
| 5,391,250 A | * | 2/1995 | Cheney, II ............. B32B 38/10 156/268 |
| 5,485,408 A | | 1/1996 | Blomquist |
| 5,522,803 A | | 6/1996 | Teissen-Simony |
| 5,665,065 A | | 9/1997 | Colman et al. |
| 5,800,420 A | | 9/1998 | Gross et al. |
| 5,807,375 A | | 9/1998 | Gross et al. |
| 5,925,021 A | | 7/1999 | Castellano et al. |
| 5,954,643 A | | 9/1999 | Van Antwerp et al. |
| 6,017,328 A | | 1/2000 | Fischell et al. |
| 6,186,982 B1 | | 2/2001 | Gross et al. |
| 6,246,992 B1 | | 6/2001 | Brown |
| 6,248,067 B1 | | 6/2001 | Causey, III et al. |
| 6,248,093 B1 | | 6/2001 | Moberg |
| 6,355,021 B1 | | 3/2002 | Nielsen et al. |
| 6,379,301 B1 | | 4/2002 | Worthington et al. |

(Continued)

FOREIGN PATENT DOCUMENTS

KR     20140140502     * 12/2014

OTHER PUBLICATIONS

KR20140140502 English translation (Year: 2014).*

*Primary Examiner* — Bach T Dinh
(74) *Attorney, Agent, or Firm* — Lorenz & Kopf, LLP

(57) ABSTRACT

Sensors and methods for manufacturing sensors are provided. An exemplary method for manufacturing a sensor includes forming an electrode lead pattern over an insulator base substrate. Further, the method includes forming a structural backing layer over the electrode lead pattern and insulator base substrate. Also, the method includes performing a cutting process to cut through the structural backing layer to form a structural backing over the electrode lead pattern.

20 Claims, 6 Drawing Sheets

(56) References Cited

U.S. PATENT DOCUMENTS

| | | |
|---|---|---|
| 6,544,212 B2 | 4/2003 | Galley et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,736,797 B1 | 5/2004 | Larsen et al. |
| 6,749,587 B2 | 6/2004 | Flaherty |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Hunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Istoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 2003/0111344 A1* | 6/2003 | Yamaoka ............... C12Q 1/002 204/403.06 |
| 2006/0131171 A1* | 6/2006 | Kobayashi ........ B01L 3/502707 204/403.01 |
| 2007/0123819 A1 | 5/2007 | Mernoe et al. |
| 2007/0278097 A1* | 12/2007 | Bhullar ............... B29C 65/1645 204/403.01 |
| 2010/0108509 A1* | 5/2010 | Curry .................... C12Q 1/002 204/403.14 |
| 2010/0160861 A1 | 6/2010 | Causey, III et al. |
| 2010/0200538 A1* | 8/2010 | Petisce .................. B32B 37/025 216/13 |
| 2010/0230285 A1* | 9/2010 | Hoss .................. G01N 27/3272 204/415 |
| 2011/0079522 A1* | 4/2011 | Webster ................. C12Q 1/006 205/792 |
| 2015/0094554 A1* | 4/2015 | Heller ................ A61B 5/14546 600/347 |

\* cited by examiner

STRUCTURALLY REINFORCED SENSOR AND METHOD FOR MANUFACTURING THE SAME

TECHNICAL FIELD

Embodiments of the subject matter described herein relate generally to sensors for sensing and/or determining physiological characteristics of subcutaneous interstitial fluid, and more particularly, to such sensors that determine constituents of subcutaneous interstitial fluid, such as glucose levels in subcutaneous interstitial fluid, during in vivo or in vitro applications and to methods for manufacturing such sensors.

BACKGROUND

The determination of glucose levels in subcutaneous interstitial fluid is useful in a variety of applications. One particular application is for use by diabetics in combination with an insulin infusion pump system. The use of insulin pumps is frequently indicated for patients, particularly for diabetics whose conditions are best treated or stabilized by the use of insulin infusion pumps. Glucose sensors are useful in combination with such pumps, since these sensors may be used to determine glucose levels and provide information useful to the system to monitor the administration of insulin in response to actual and/or anticipated changes in blood glucose levels. For example, glucose levels are known to change in response to food and beverage intake, as well as to normal metabolic function. While certain diabetics are able to maintain proper glucose-insulin levels with conventional insulin injection or other insulin administration techniques, some individuals experience unusual problems giving rise to the need for a substantially constant glucose monitoring system to maintain an appropriate glucose-insulin balance in their bodies.

In order to insert a sensor under the skin and into contact with subcutaneous interstitial fluid, a needle may be used. After insertion, in certain embodiments, the inserted portion of the sensor may be positioned and maintained at a pre-determined insertion angle to a remaining portion of the sensor lying adjacent the outer surface of the skin. In such embodiments, a neck region of the sensor facilitates forming of the pre-determined angle and provides a geometry which enables the needle to capture and engage the sensor during insertion.

While sensors are commonly used to monitor glucose, embodiments of these sensors may encounter technical challenges when scaled. Specifically, users may encounter difficulty when inserting a smaller sensor without damaging the sensor. In view of these and other issues, sensors and methods for manufacturing sensors designed with structural reinforcement are desirable.

BRIEF SUMMARY

Sensors and methods for manufacturing sensors having reinforced structural support are provided. An exemplary method for manufacturing a sensor includes forming an electrode lead pattern over an insulator base substrate; forming a structural backing layer over the electrode lead pattern and insulator base substrate; and performing a cutting process to cut through the structural backing layer to form a structural backing over the electrode lead pattern.

In certain embodiments, the method may further include forming an upper insulator over the insulator base substrate and adjacent the electrode lead pattern before forming the structural backing layer over the electrode lead pattern and insulator base substrate. In other embodiments, the method may further include forming an upper insulator over the structural backing and the insulator base substrate after performing the cutting process to cut through the structural backing layer to form the structural backing over the electrode lead pattern.

In certain embodiments, the method further includes forming the insulator base substrate over a wafer before forming the electrode lead pattern over the insulator base substrate. In certain embodiments, the method may include forming an upper insulator over the structural backing and the insulator base substrate after performing the cutting process to cut through the structural backing layer to form the structural backing over the electrode lead pattern. In certain embodiments, the method may include forming an upper insulator over the insulator base substrate, wherein the insulator base substrate is polyimide, wherein the electrode lead pattern is formed from gold and/or titanium, wherein the structural backing layer is polyimide, and wherein the upper insulator is polyimide.

In certain embodiments, the method may further include forming an underlying layer of titanium or chromium over the electrode lead pattern and insulator base substrate, wherein forming the structural backing layer over the electrode lead pattern and insulator base substrate comprises forming the structural backing layer over the underlying layer of titanium or chromium.

In certain embodiments, performing the cutting process to cut through the structural backing layer to form the structural backing over the electrode lead pattern includes simultaneously cutting through the structural backing layer and the insulator base substrate. Such cutting process may be a laser cutting process.

In certain embodiments of the method, forming the electrode lead pattern over the insulator base substrate includes forming the electrode lead pattern with a first terminal lead, a second terminal lead, and intermediate leads located between the first terminal lead and the second terminal lead; the electrode lead pattern is formed with a width extending from the first terminal lead to the second terminal lead; and performing the cutting process to cut through the structural backing layer to form the structural backing over the electrode lead pattern comprises covering the electrode lead pattern over the width continuously from the first terminal lead to the second terminal lead.

In certain embodiments of the method, forming the electrode lead pattern over the insulator base substrate comprises forming the electrode lead pattern with a first terminal lead, a second terminal lead, and intermediate leads located between the first terminal lead and the second terminal lead; the electrode lead pattern is formed with a width extending from the first terminal lead to the second terminal lead; and performing the cutting process to cut through the structural backing layer to form the structural backing over the electrode lead pattern comprises cutting the structural backing layer into distinct segments, wherein the structural backing layer does not cover the electrode lead pattern over the width continuously from the first terminal lead to the second terminal lead.

In another embodiment, a method for manufacturing sensors is provided and includes forming an insulator base substrate over a wafer; forming a plurality of electrode lead patterns over the insulator base substrate; forming a structural backing layer over the plurality of electrode lead patterns and insulator base substrate; and performing a cutting process to cut through the structural backing layer to form a structural backing over each respective electrode lead pattern.

In certain embodiments, the method for manufacturing sensors further includes forming an upper insulator over the insulator base substrate and adjacent each respective electrode lead pattern before forming the structural backing layer over the plurality of electrode lead patterns and insulator base substrate. In other embodiments, the method for manufacturing sensors includes forming an upper insulator over each respective structural backing and the insulator base substrate after performing the cutting process to cut through the structural backing layer to form each respective structural backing.

The method for manufacturing sensors may further include forming an upper insulator over each respective structural backing and the insulator base substrate after performing the cutting process to cut through the structural backing layer to form each respective structural backing.

In certain embodiments, method for manufacturing sensors includes forming an underlying layer of titanium or chromium over the electrode lead pattern and insulator base substrate, wherein forming the structural backing layer over the plurality of electrode lead patterns and insulator base substrate comprises forming the structural backing layer over the underlying layer of titanium or chromium.

In certain embodiments, the method for manufacturing sensors further includes forming an upper insulator over the insulator base substrate, wherein the insulator base substrate is polyimide, wherein the plurality of electrode lead patterns is formed from gold and/or titanium, wherein the structural backing layer is polyimide, and wherein the upper insulator is polyimide.

In certain embodiments of the method for manufacturing sensors, performing the cutting process to cut through the structural backing layer to form each respective structural backing comprises simultaneously cutting through the structural backing layer and the insulator base substrate. Further, the cutting process may be a laser cutting process.

In certain embodiments of the method for manufacturing sensors, forming the plurality of electrode lead patterns over the insulator base substrate includes forming each electrode lead pattern with a first terminal lead, a second terminal lead, and intermediate leads located between the first terminal lead and the second terminal lead; each electrode lead pattern has a width extending from the first terminal lead to the second terminal lead; and performing the cutting process to cut through the structural backing layer to form each respective structural backing comprises covering each electrode lead pattern over the respective width continuously from the first terminal lead to the second terminal lead. In other embodiments of the method for manufacturing sensors, forming the plurality of electrode lead patterns over the insulator base substrate includes forming each electrode lead pattern with a first terminal lead, a second terminal lead, and intermediate leads located between the first terminal lead and the second terminal lead; each electrode lead pattern has a width extending from the first terminal lead to the second terminal lead; and performing the cutting process to cut through the structural backing layer to form each respective structural backing comprises cutting the structural backing layer into distinct segments, wherein each structural backing layer does not cover the respective electrode lead pattern over the respective width continuously from the first terminal lead to the second terminal lead.

In another embodiment, a sensor is provided and includes an insulator base substrate; an electrode lead pattern over the insulator base substrate; and a structural backing layer over the electrode lead pattern and insulator base substrate.

In certain embodiments, the sensor further includes an upper insulator over the insulator base substrate, wherein the structural backing layer is located over the upper insulator. In other embodiments, the sensor further includes an upper insulator over the insulator base substrate, the electrode lead pattern, and the structural backing layer.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description. Also, while the preceding background discusses glucose sensing and exemplary physiological characteristic sensors are described as glucose sensors herein, such description is for convenience and is not limiting. The claimed subject matter may include any type of physiological characteristic sensor utilizing an embodiment of the sensor electrode described herein.

Embodiments of physiological characteristic sensors provided herein may use biological elements to convert a chemical analyte in a matrix into a detectable signal. In certain embodiments, a physiological characteristic sensor of the type presented here is designed and configured for subcutaneous operation in the body of a patient. The physiological characteristic sensor includes electrodes that are electrically coupled to a suitably configured electronics module that applies the necessary excitation voltages and monitors the corresponding electrical responses (e.g., electrical current, impedance, or the like) that are indicative of physiological characteristics of the body of the patient. For certain embodiments described here, the physiological characteristic sensor includes at least one working electrode, which is fabricated in a particular manner to provide the desired electrochemical characteristics. In this regard, for sensing glucose levels in a patient, the physiological characteristic sensor works according to the following chemical reactions:

$$\text{GLUCOSE} + O_2 \xrightarrow{GOx} \text{GLUCONIC ACID} + H_2O_2 \quad \text{(Equation 1)}$$

$$H_2O_2 \rightarrow O_2 + 2H^+ + 2e^- \quad \text{(Equation 2)}$$

The glucose oxidase (GOx) is provided in the sensor and is encapsulated by a semipermeable membrane adjacent the working electrode. The semipermeable membrane allows for selective transport of glucose and oxygen to provide contact with the glucose oxidase. The glucose oxidase catalyzes the reaction between glucose and oxygen to yield gluconic acid and hydrogen peroxide (Equation 1). The $H_2O_2$ then contacts the working electrode and reacts electrochemically as shown in Equation 2 under electrocatalysis by the working electrode. The resulting current can be measured by a potentiostat. These reactions, which occur in a variety of oxidoreductases known in the art, are used in a number of sensor designs.

Figure 1:
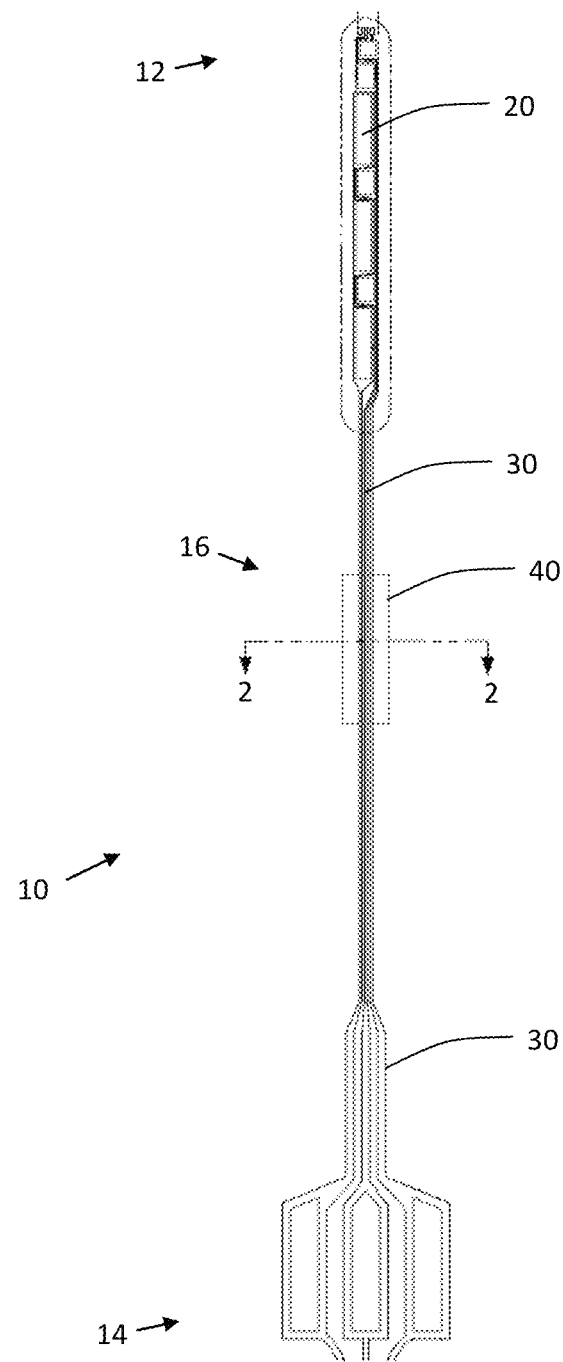
FIG. 1 is an overhead view of an exemplary embodiment of a physiological characteristic sensor.
Figure 2:
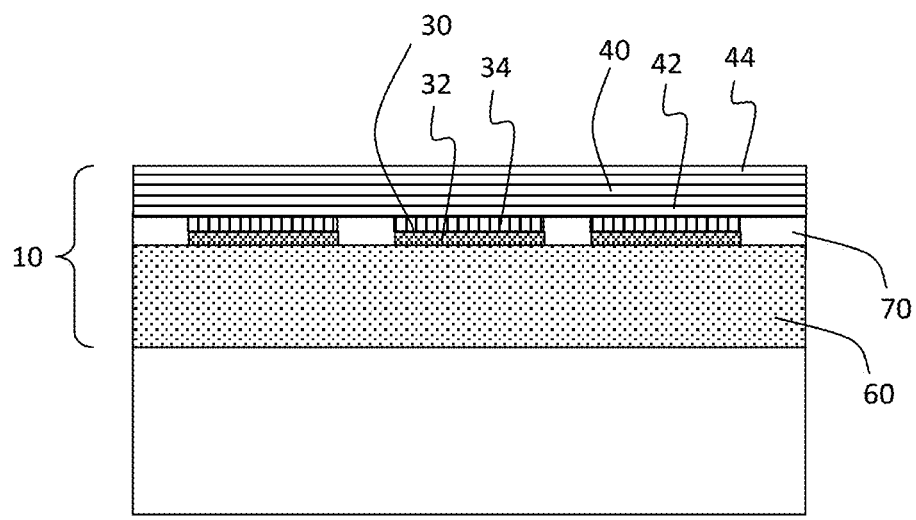
FIG. 2 is a cross-sectional view taken along line 2-2 in FIG. 1 of the exemplary embodiment of a physiological characteristic sensor.

FIG. 1 is a schematic representation of an exemplary embodiment of a partially formed physiological characteristic sensor 10. FIG. 2 is a cross-sectional view of the partially formed physiological characteristic sensor 10 of FIG. 1. The sensor 10 is suitably configured to measure a physiological characteristic of the subject, e.g., a human patient. In accordance with the non-limiting embodiments presented here, the physiological characteristic of interest is glucose, and the sensor 10 generates output that is indicative of a blood glucose level of the subject. It should be appreciated that the techniques and methodologies described here may also be utilized with other sensor types if so desired.

The sensor 10 includes sensor electrodes 20 at a distal end 12 of the sensor 10 designed for subcutaneous placement at a selected site in the body of a user. When placed in this manner, the sensor electrodes 20 are exposed to the user's bodily fluids such that they can react in a detectable manner to the physiological characteristic of interest, e.g., blood glucose level. In certain embodiments, the sensor electrodes 20 may include one or more working electrodes, counter electrodes, and reference electrodes. For the embodiments described here, the sensor electrodes 20 employ thin film electrochemical sensor technology of the type used for monitoring blood glucose levels in the body. Further description of flexible thin film sensors of this general type are found in U.S. Pat. No. 5,391,250, entitled METHOD OF FABRICATING THIN FILM SENSORS, which is herein incorporated by reference. In other embodiments, different types of implantable sensor technology, such as chemical based, optical based, or the like, may be used.

The sensor electrodes 20 cooperate with sensor electronics, which may be integrated with the sensor electrodes 20 in a sensor device package, or which may be implemented in a physically distinct device or component that communicates with the sensor electrodes 20 (such as a monitor device, an infusion pump device, a controller device, or the like). For example, each sensor electrode 20 is electrically connected to an electrode lead 30 that extends to a proximal end 14 of the sensor 10 and is formed for electrical coupling to other electrical components as is well known. As shown, each electrode lead 30 extends through an intermediate portion 16 of the sensor 10, which may be referred to as a neck region. During placement in a patient, the intermediate portion 16 of the sensor 10 may be bent at an angle of 90 degrees while the distal end 12 of the sensor 10 is inserted via a needle. The needle may then be withdrawn while the distal end 12 of the sensor 10 remains at the placement location.

As generally shown in FIG. 1, the intermediate portion 16 of the sensor 10 may be reinforced with a structural backing component 40 in order to reduce the chance of structural failure of the sensor 10 during placement under the skin or during removal of the placement needle.

In FIG. 2, it can be seen that during manufacture, the sensor 10 is formed over a substrate 50, such as a glass wafer, before being removed from the wafer for use. Specifically, an insulator base or insulator base substrate 60 may be formed over, and more particularly on, the substrate 50. In an exemplary embodiment, the insulator base 60 is formed from polyimide or another suitable biocompatible and electrically insulating material.

As further shown, each electrode lead 30 is formed over the upper surface of the insulator base 60. More particularly, each electrode lead 30 is formed on the insulator base 60. In an exemplary embodiment, each electrode lead 30 may include a lower layer 32 and an upper layer 34. In an exemplary embodiment, the lower layer 32 is titanium and the upper layer 34 is gold.

The sensor 10 of FIG. 2 further includes an upper insulator 70. In an exemplary embodiment, the upper insulator 70 is formed over the upper surface of the insulator base 60, such as on the insulator base 60. In an exemplary embodiment, the upper insulator 70 is formed from polyimide or another suitable biocompatible and electrically insulating material. While FIG. 2 illustrates the upper insulator 70 is having a substantially same height or thickness as the electrode leads 30, the upper insulator 70 may have a greater thickness than the electrode leads 30 and may overlap or cover outer portions of the upper surface of each electrode lead 30.

As further shown in the embodiment of FIG. 2, the structural backing component 40 is formed over the electrode leads 30 and the upper insulator 70. An exemplary structural backing component 40 is formed from polyimide or another suitable biocompatible and electrically insulating material.

In certain embodiments, the structural backing component 40 may include a lower layer 42 and an upper layer 44. For example, the upper layer 44 may be formed from the polyimide or other suitable biocompatible and electrically insulating material, while the lower layer 42 is formed from a stiffer material. For example, the lower layer 42 may be titanium.

Figure 3:
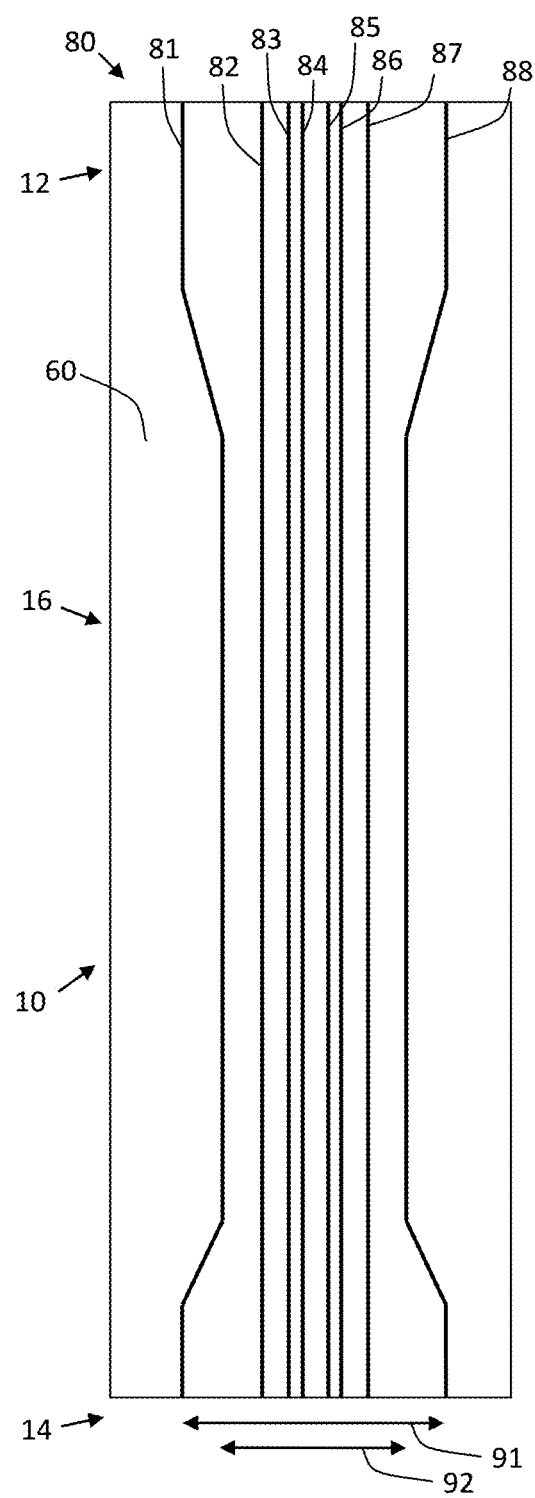
FIG. 3 is an overhead view of an exemplary embodiment of a physiological characteristic sensor during a stage of manufacturing.

FIG. 3 illustrates a manufacturing stage of an exemplary sensor 10 after formation of the insulator base 60 over the substrate 50 (not shown). In FIG. 3, an electrode lead pattern 80 (i.e., a pattern of electrode leads 30 of FIGS. 1 and 2) is formed over the insulator base 60. While eight leads are illustrated, the electrode lead pattern 80 may include any practical number as desired. As shown, the electrode lead pattern 80 includes a first terminal electrode lead 81, a second terminal electrode lead 88, and intermediate leads 82, 83, 84, 85, 86, and 87 therebetween. The electrode lead pattern 80 is formed with a first width 91 from the first terminal electrode lead 81 to the second terminal electrode lead 88 at the distal end 12 and proximal end 14 of the sensor 10, and with a second width 92 from the first terminal electrode lead 81 to the second terminal electrode lead 88 at the intermediate region 16 of the sensor 10. As shown, the second width 92 is less than the first width 91.

Figure 4:
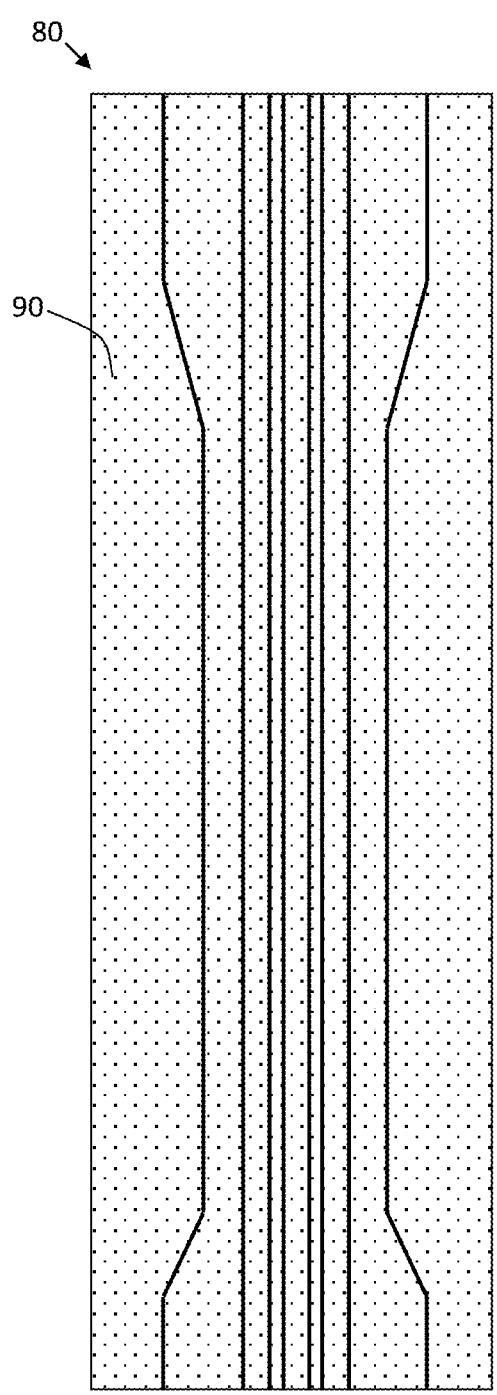
FIG. 4 is an overhead view of the physiological characteristic sensor of FIG. 3 during a later stage of manufacturing.

The method may continue in FIG. 4. While the upper insulator 70 is not illustrated, the manufacturing process may include forming the upper insulator 70 around and partially over each electrode lead in the electrode lead pattern 80. As shown in FIG. 4, the method includes forming a structural backing layer 90 over the electrode lead pattern 80 and insulator base substrate (not shown). The structural backing layer 90 is illustrated as being partially transparent to allow view of the electrode lead pattern 80.

Figures 5, 6:
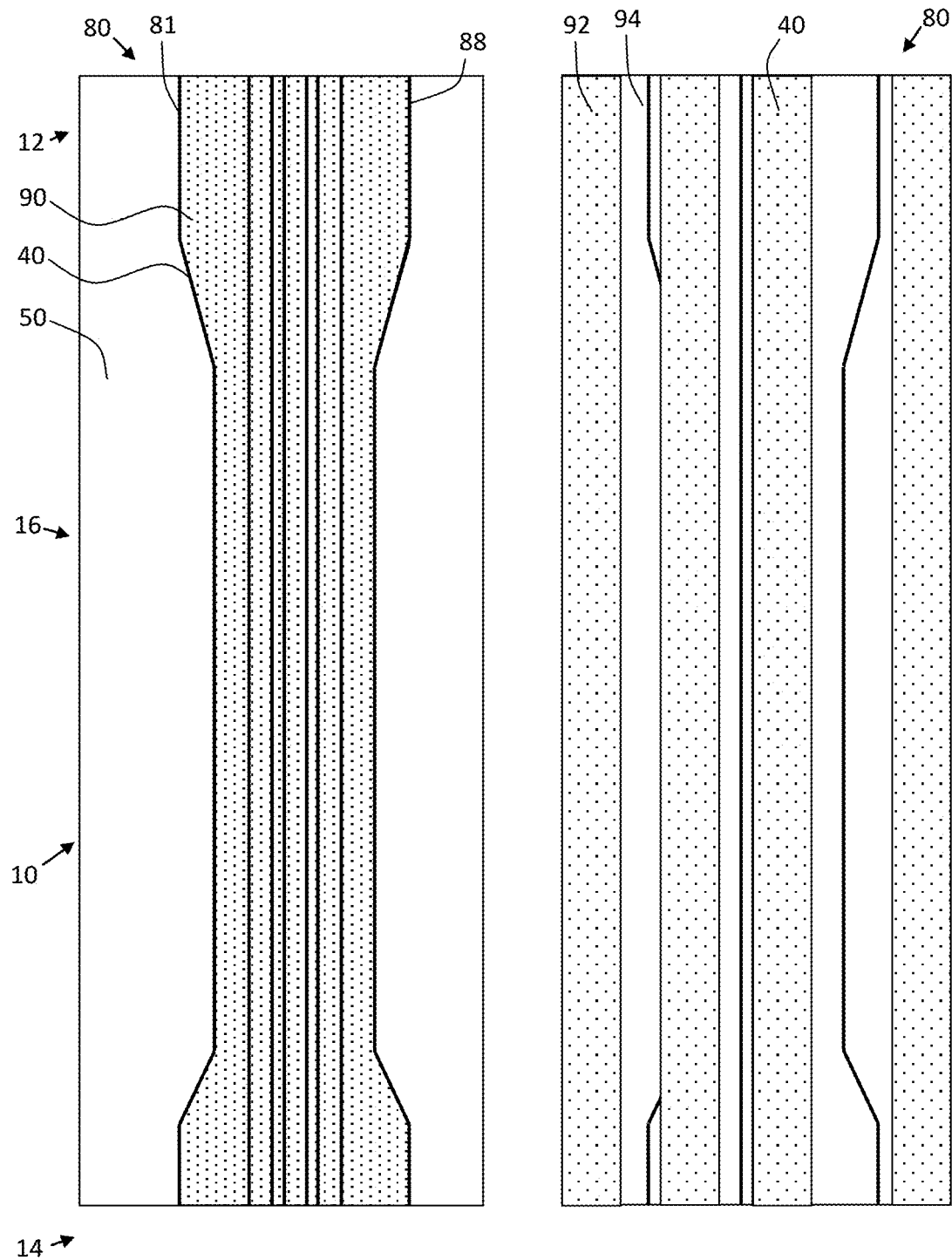
FIG. 5 is an overhead view of one embodiment of the physiological characteristic sensor of FIG. 4 during a later stage of manufacturing.
FIG. 6 is an overhead view of another embodiment of the physiological characteristic sensor of FIG. 4 during a later stage of manufacturing.

The method may continue in FIG. 5 with a cutting process to cut through the structural backing layer 90 to form and define the structural backing 40 over the electrode lead pattern 80. In certain embodiments, the cutting process also cuts the insulator base (not shown) so that the substrate 50 is visible adjacent the cut edges of the structural backing 40. Alternatively, the cutting process may only cut the structural backing layer 90.

In the embodiment of FIG. 5, the structural backing layer 90 is cut in alignment with the terminal electrode leads 81 and 88, though such an arrangement is not required. For example, a buffer or overlap region may be provided such that the structural backing 40 has a greater width than the electrode lead pattern 80 at the distal end 12, proximal end 14, and/or intermediate region 16.

FIG. 6 illustrates an alternative embodiment. Specifically, the method may continue in FIG. 6 with a cutting process to cut through the structural backing layer 90 of FIG. 4 to form and define the structural backing 40 over the electrode lead pattern 80. As shown in FIG. 6, the structural backing 40 is formed with distinct segments 92 that are separated from one another by gaps 94. In FIG. 6, the structural backing 40 is not illustrated as being transparent for purposes of clarity and does not indicate any material difference in the composition of the structural backing 40 as illustrated in different figures.

Figure 7:
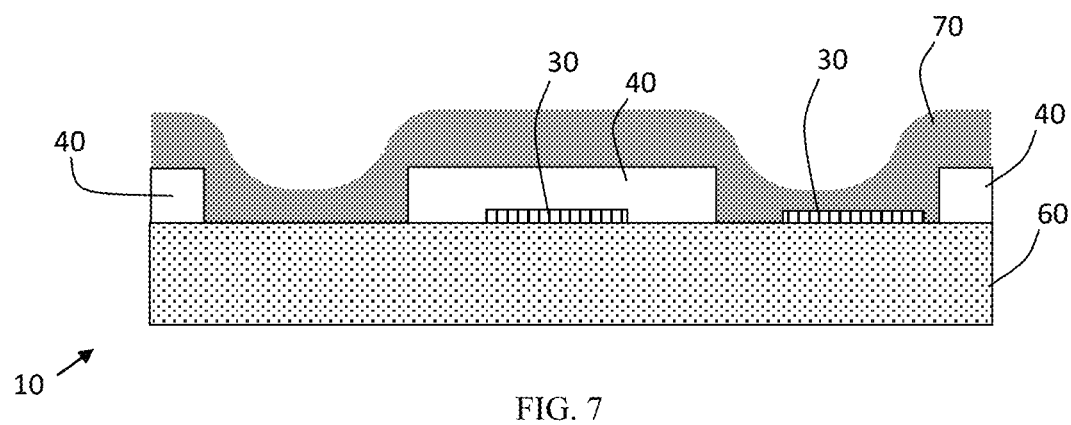
FIG. 7 is an expanded cross-sectional view of the physiological characteristic sensor of FIG. 6 during a later stage of manufacturing.

As described above, the upper insulator 70 may be formed before the structural backing 40, such that the structural backing 40 is formed over the upper insulator 70. In other embodiments, the upper insulator 70 may be formed after, and over, the structural backing 40. For example, FIG. 7 illustrates a cross-sectional view of a portion of the sensor 10 of the embodiment of FIG. 6 during further processing. In the embodiment of FIG. 7, the electrode lead 30 is formed on the insulator base 60. Then, the structural backing 40 is formed directly on the electrode lead 30 (and directly on the insulator base 60). As indicated in FIG. 6, certain electrode leads 30 and/or portions of certain electrode leads 30 may not be covered by the structural backing 40.

Figure 8:
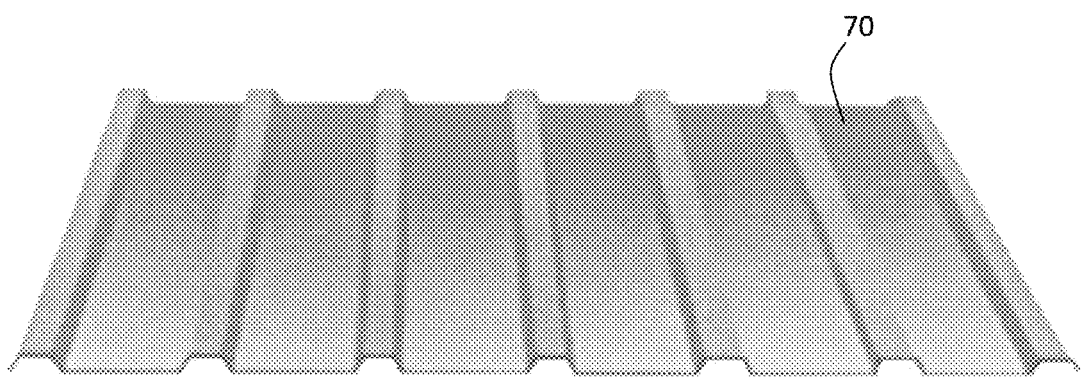
FIG. 8 is a perspective view of the upper insulator layer of the physiological characteristic sensor of FIG. 7.

After the structural backing layer is depositing and cut to form the structural backing 40, the upper insulator 70 may be formed. For example, a conformal deposition process may be used to blanket deposit the upper insulator 70 over the structural backing 40, electrode leads 30 and insulator base 60, as shown in FIG. 7. FIG. 8 provides a perspective view of the resulting corrugated shape of the upper insulator 70.

Figure 9:
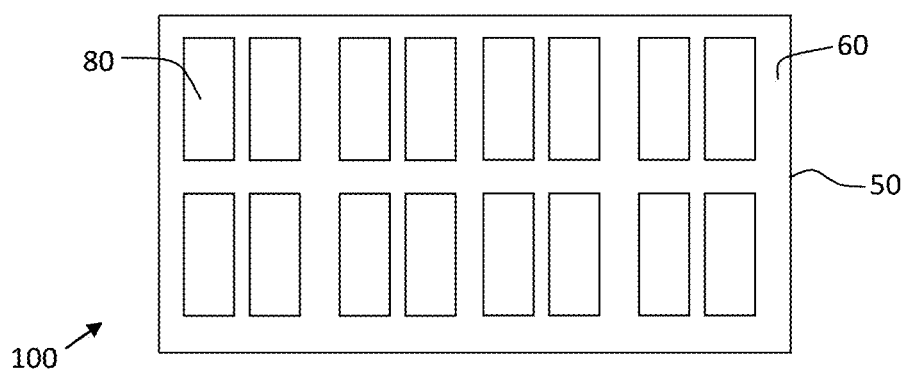
FIGS. 9-11 are overhead schematic views of a wafer including a plurality of sensors during successive stages of manufacturing.
Figure 10:
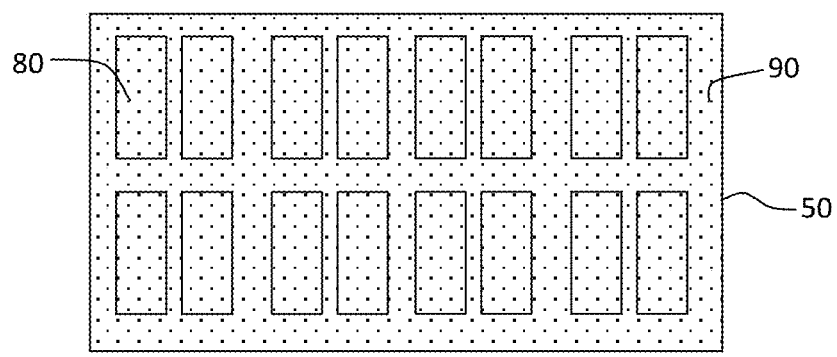
Figure 11:
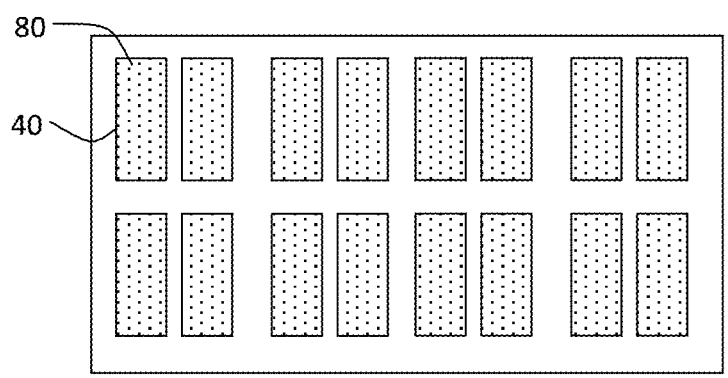

During manufacturing, a large number of sensors may be formed on a substrate such as a wafer. For example, for an eight inch wafer, 540 sensors may be formed by the same processing. FIGS. 9-11 generally illustrate the manufacture of a plurality of sensors on a wafer substrate.

As shown in FIG. 9, an insulator base 60 is formed over a wafer 50 before a plurality 100 of electrode lead patterns 80 are formed over the insulator base 60. In FIG. 10, a structural backing layer 90 (illustrated as being transparent) is formed over the entire wafer 50, including over the plurality of electrode lead patterns 80 and insulator base 60. In FIG. 11, a cutting process is performed to cut through the structural backing layer 90 to form a structural backing 40 over each respective electrode lead pattern 80.

Physiological characteristic sensors and methods for manufacturing physiological characteristic sensors designed with enhanced structural strength are provided herein. As described, an additional structural backing is implemented and is included in the manufacturing process as a deposited and cut layer, along with the other layers used in the manufacturing process. In this manner, inclusion of the additional structural backing is compatible with existing processing.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for manufacturing a sensor having a distal end and an intermediate region adjacent to the distal end, the method comprising:
   forming sensor electrodes over an insulator base substrate, wherein the sensor electrodes are confined to the distal end of the sensor;
   forming an electrode lead pattern over the insulator base substrate, wherein the electrode lead pattern includes electrode leads configured for contact with the sensor electrodes, and wherein the electrode leads extend completely across the intermediate region in a longitudinal direction;
   forming a structural backing layer over the electrode lead pattern and insulator base substrate, wherein the structural backing layer is confined to the intermediate region; and
   performing a cutting process to cut through the structural backing layer to form a side edge of a structural backing over the electrode lead pattern, wherein the side edge extends completely across the structural backing layer in the longitudinal direction; and
   wherein the structural backing lies over at least two adjacent electrode leads in the intermediate region of the sensor.

2. The method of claim 1, further comprising forming an upper insulator over the insulator base substrate and adjacent the electrode lead pattern before forming the structural backing layer over the electrode lead pattern and insulator base substrate.

3. The method of claim 1, further comprising forming an underlying layer of titanium or chromium over the electrode lead pattern and insulator base substrate in the intermediate region of the sensor, wherein the structural backing layer directly contacts and covers the underlying layer of titanium or chromium.

4. The method of claim 1, further comprising forming an underlying layer of titanium or chromium over the electrode lead pattern and insulator base substrate in the intermediate region of the sensor, wherein forming the structural backing layer over the electrode lead pattern and insulator base substrate comprises forming the structural backing layer over the underlying layer of titanium or chromium in the intermediate region of the sensor.

5. The method of claim 1 wherein performing the cutting process to cut through the structural backing layer forms a first side edge of a first structural backing segment and a second side edge of a second structural backing segment, wherein the first structural backing segment is separated from the second structural backing segment by a gap extending completely across the structural backing layer in the longitudinal direction.

6. The method of claim 5 wherein at least a portion of an electrode lead is located directly under and is exposed by the gap.

7. The method of claim 1 wherein:
the electrode leads include a first terminal lead, a second terminal lead, and intermediate leads located between the first terminal lead and the second terminal lead;
the electrode lead pattern has a width extending from the first terminal lead to the second terminal lead; and
performing the cutting process to cut through the structural backing layer to form the side edge of the structural backing over the electrode lead pattern comprises forming the structural backing with a first side edge and a second side edge, wherein each side edge extends completely across the structural backing layer in the longitudinal direction, wherein the structural backing is continuous from the first side edge to the second side edge, and wherein the structural backing covers the electrode lead pattern over the width continuously from the first terminal lead to the second terminal lead in the intermediate region of the sensor.

8. The method of claim 1 wherein:
the electrode leads include a first terminal lead, a second terminal lead, and intermediate leads located between the first terminal lead and the second terminal lead;
the electrode lead pattern has a width extending from the first terminal lead to the second terminal lead;
performing the cutting process to cut through the structural backing layer to form the side edge of the structural backing over the electrode lead pattern comprises forming the structural backing with a first side edge and a second side edge, wherein each side edge extends completely across the structural backing layer in the longitudinal direction, wherein the first terminal lead and the second terminal lead lie between the first side edge and the second side edge;
performing the cutting process to cut through the structural backing layer to form the side edge of the structural backing over the electrode lead pattern comprises cutting the structural backing layer into distinct segments, wherein the structural backing does not cover the electrode lead pattern over the width continuously from the first terminal lead to the second terminal lead.

9. The method of claim 1, further comprising forming an underlying layer of titanium or chromium over the electrode lead pattern and insulator base substrate, wherein the underlying layer of titanium or chromium is confined to the intermediate region of the sensor.

10. A method for manufacturing sensors, the method comprising:
forming an insulator base substrate over a wafer;
forming a plurality of electrode lead patterns over the insulator base substrate;
forming an underlying layer of titanium or chromium over the electrode lead patterns and insulator base substrate;
forming a structural backing layer over the underlying layer of titanium or chromium; and
performing a cutting process to cut through both the structural backing layer and the underlying layer of titanium or chromium to form a plurality of structural backings therefrom, wherein a structural backing is formed over each respective electrode lead pattern; and
forming an upper insulator over each respective structural backing and the insulator base substrate after performing the cutting process to cut through both the structural backing layer and the underlying layer of titanium or chromium to form the plurality of structural backings therefrom.

11. A method for manufacturing sensors, the method comprising:
forming an insulator base substrate over a wafer;
forming a plurality of electrode lead patterns over the insulator base substrate;
forming an underlying layer of titanium or chromium over the electrode lead patterns and insulator base substrate;
forming a structural backing layer over the underlying layer of titanium or chromium; and
performing a cutting process to cut through both the structural backing layer and the underlying layer of titanium or chromium to form a plurality of structural backings therefrom, wherein a structural backing is formed over each respective electrode lead pattern, wherein each respective sensor extends from a proximal end to a distal end, wherein each electrode lead pattern extends from the proximal end to the distal end of the respective sensor, and wherein each structural backing extends continuously from the proximal end to the distal end of the respective sensor.

12. The method of claim 11, further comprising forming an upper insulator over each respective structural backing and the insulator base substrate after performing the cutting process to cut through both the structural backing layer and the underlying layer of titanium or chromium to form the plurality of structural backings therefrom.

13. The method of claim 10 A method for manufacturing sensors, the method comprising:
forming an insulator base substrate over a wafer;
forming a plurality of electrode lead patterns over the insulator base substrate;
forming an underlying layer of titanium or chromium over the electrode lead patterns and insulator base substrate;
forming a structural backing layer over the underlying layer of titanium or chromium; and
performing a cutting process to cut through both the structural backing layer and the underlying layer of titanium or chromium to form a plurality of structural backings therefrom, wherein a structural backing is formed over each respective electrode lead pattern, wherein more than one structural backing is formed over each respective electrode lead pattern, wherein over each respective electrode lead pattern a gap is defined between adjacent structural backings, wherein each respective sensor extends from a proximal end to a distal end, wherein each electrode lead pattern extends from the proximal end to the distal end of the respective sensor, and wherein each structural backing extends continuously from the proximal end to the distal end of the respective sensor.

14. The method of claim 10 wherein each electrode lead pattern includes at least two electrode leads, and wherein the structural backing formed over each respective electrode lead pattern covers at least two electrode leads.

15. The method of claim 10 wherein performing the cutting process to cut through the structural backing layer and the underlying layer of titanium or chromium to form each respective structural backing comprises simultaneously cutting through the structural backing layer, the underlying layer of titanium or chromium, and the insulator base substrate.

16. The method of claim 10 wherein:
forming the plurality of electrode lead patterns over the insulator base substrate comprises forming each electrode lead pattern with a first terminal lead, a second terminal lead, and intermediate leads located between the first terminal lead and the second terminal lead;
each electrode lead pattern has a width extending from the first terminal lead to the second terminal lead; and
performing the cutting process to cut through both the structural backing layer and the underlying layer of titanium or chromium comprises covering each electrode lead pattern with a respective structural backing over the respective width continuously from the first terminal lead to the second terminal lead.

17. The method of claim 10 wherein:
forming the plurality of electrode lead patterns over the insulator base substrate comprises forming each electrode lead pattern with a first terminal lead, a second terminal lead, and intermediate leads located between the first terminal lead and the second terminal lead;
each electrode lead pattern has a width extending from the first terminal lead to the second terminal lead; and
performing the cutting process to cut through both the structural backing layer and the underlying layer of titanium or chromium comprises cutting the structural backing layer and the underlying layer of titanium or chromium into distinct segments of structural backing, wherein each segment of structural backing does not cover the respective electrode lead pattern over the respective width continuously from the first terminal lead to the second terminal lead.

18. The method of claim 16 wherein:
each sensor has a length from a proximal end to a distal end;
each sensor includes one electrode lead pattern; and
each structural backing extends continuously from the proximal end to the distal end.

19. The method of claim 17 wherein:
each sensor has a length from a proximal end to a distal end,
each sensor includes one electrode lead pattern; and
each structural backing segment extends continuously from the proximal end to the distal end.

20. The method of claim 1 further comprising forming an underlying layer of titanium or chromium over the electrode lead pattern and insulator base substrate, wherein forming the structural backing layer over the electrode lead pattern and insulator base substrate comprises forming the structural backing layer directly on the underlying layer of titanium or chromium, and wherein performing the cutting process comprises cutting through both the structural backing layer and the underlying layer of titanium or chromium to form the structural backing therefrom.

* * * * *